United States Patent [19]

Markle et al.

[11] Patent Number: 4,710,805
[45] Date of Patent: Dec. 1, 1987

[54] METHOD OF, AND APPARATUS FOR, MODIFYING LUMINANCE LEVELS OF A BLACK AND WHITE VIDEO SIGNAL

[75] Inventors: Wilson Markle, Toronto, Canada; Christopher Mitchell, Anaheim, Calif.

[73] Assignee: Colorization Inc., Toronto, Canada

[21] Appl. No.: 512,844

[22] Filed: Jul. 11, 1983

[30] Foreign Application Priority Data

May 5, 1983 [CA] Canada .................................. 427543

[51] Int. Cl.⁴ ............................................. H04N 9/43
[52] U.S. Cl. ...................................... 358/81; 358/82; 358/169; 358/27
[58] Field of Search ..................... 358/81, 82, 27, 28, 358/169

[56] References Cited

U.S. PATENT DOCUMENTS

| | | | |
|---|---|---|---|
| 3,647,942 | 3/1972 | Siegel | 358/82 |
| 3,706,841 | 12/1972 | Novak | 358/82 |
| 3,761,607 | 9/1973 | Hanseman | 358/81 |
| 3,772,465 | 11/1973 | Vlahos | 358/22 |
| 3,972,067 | 7/1976 | Peters | 358/81 |
| 4,395,732 | 7/1983 | Upton | 358/169 |
| 4,403,253 | 9/1983 | Morris | 358/169 |
| 4,574,393 | 3/1986 | Blackwell | 358/81 |
| 4,606,625 | 8/1986 | Geshwind | 358/81 |
| 4,608,596 | 8/1986 | Williams | 358/81 |

*Primary Examiner*—Michael A. Masinick
*Attorney, Agent, or Firm*—Rogers, Bereskin & Parr

[57] ABSTRACT

A method of modifying luminance levels of a black and white video signal is provided. The signal is fed to a voltage controlled amplifier and to first and second clipper amplifiers. Each clipper amplifier has an adjustable gain and an adjustable clip level, which are set to desired levels. The outputs of the clipper amplifiers are fed to a summation amplifier in which they are summed to produce a control signal. The control signal is fed to the voltage controlled amplifier, to vary its gain, and thus to compress one band of luminance levels whilst expanding another band of luminance levels.

2 Claims, 7 Drawing Figures

METHOD OF, AND APPARATUS FOR, MODIFYING LUMINANCE LEVELS OF A BLACK AND WHITE VIDEO SIGNAL

This invention relates to a method of, and an apparatus for, modifying the luminance levels of a black and white video signal.

At the present time, nearly all films and video recordings are produced in colour. Consequently, the public are used to colour productions, and expect such products to be in full colour. However, there is also a large stock of old black and white productions, which were made before the advent of colour technology. In order to make these old black and white productions more acceptable to the public, and to enhance their quality and appearance, it is desirable to colour these old black and white products. Theoretically, it is possible to colour an old black and white film by hand, but since there are 24 frames of film per second this would take an impractical amount of effort and time.

Accordingly, the present invention is directed to a method and apparatus which modify the luminance levels to enable a black and white video signal to be coloured.

The basic technique of the present invention described relies on the principle of assigning colour on the basis of luminance levels. However many old black and white films show poor contrast, and some gray or luminance levels are crushed making it difficult to differentiate by luminance areas which should not be coloured the same. In other words, where one should see a certain range of luminance levels, one in fact finds only a narrow band of luminance levels, thus making it difficult to distinguish different areas of each frame by means of the luminance levels. To overcome this it is desirable to provide some means of modifying a video signal in order to expand some luminance levels and to compress others.

According to the present invention, there is provided a circuit for receiving an input of a black and white video signal and for expanding and compressing bands of luminance levels to produce a modified signal at an output, the circuit comprising:

a voltage controlled amplifier connected between the input and the output, and adapted to receive the input video signal and a control signal;

first and second clipper amplifiers, each of which is adapted to receive the input video signal, and has means for adjusting the gain and means for adjusting the clip level of the respective clipper amplifier to affect their respective outputs;

a summation device connected to the outputs of the first and second clipper amplifiers for producing said control signal and connected to the voltage controlled amplifier to input said control signal thereto.

In accordance with another aspect of the present invention, there is provided a method of expanding and compressing bands of luminance levels in a black and white video signal, the method comprising:

feeding a black and white video signal to a voltage controlled amplifier and to a first clipper amplifier and a second clipper amplifier, each having means for adjusting the gain and means for adjusting the clip level of that clipper amplifier;

setting the gain and clip level of the first and second clipper amplifiers to produce desired output characteristics of the first and second clipper amplifiers;

feeding the respective output signals of said first and second clipper amplifiers to a summation amplifier and summing those output signals to produce a control signal;

feeding said control signal to said voltage controlled amplifier to alter its gain, whereby one band of luminance levels of the black and white video signal is expanded so that is occupies a wider range of luminance levels, and another band of luminance levels is compressed so that it occupies a narrower range of luminance levels.

For a better understanding of the present invention, and to show more clearly how it may be carried into effect, a description of the method of the present invention will now be given by way of example, with reference to the accompanying drawings, in which.

Figure 1:
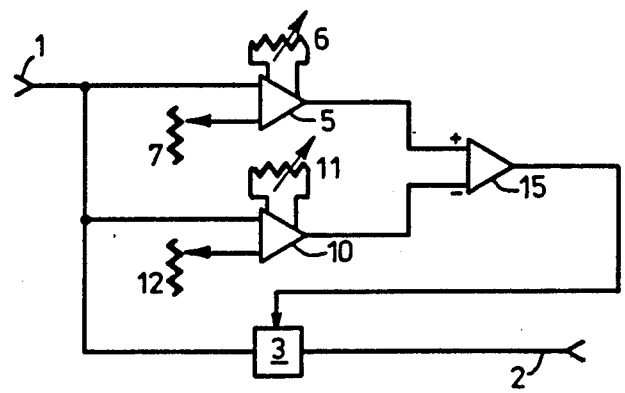
FIG. 1 shows a circuit diagram of a circuit for adjusting a video signal.

The first frame of a picture, or each separate sequence in the picture, generally has to be coloured by hand.

To colour the first frame, different parts of the frame are assigned a particular colour on the basis of luminance or gray levels. For example, the area of a persons face can be defined between two different luminance values, and this luminance range assigned an acceptable fleshtone colour. Then, each article of a person's clothing can similarly be defined by a pair of luminance levels, and coloured a chosen colour. Note, that the operator is not restricted to colouring each article with the colour that it originally had. He can choose any colour that he wishes.

For images or individual pictures which have a relatively small number of parts of different colour, which are defined by clearly spaced luminance levels, there would be little or no problem in colouring the image. Difficulties can occur if two adjacent parts which clearly should be different colours have similar luminance levels, for example due to poor contrast quality of the film. For example, a person with a pale complexion could appear against a light background and due to the low contrast value of the film both may read similar luminance levels. In this case, care is needed to sufficiently distinguish luminance levels for the person's face and the background, which ensure that the correct areas are coloured with a flesh tone and with a background colour.

Once this first frame has been coloured by hand, subsequent frames can be coloured automatically by a computer.

For subsequent frames, the computer compares the frame with the previously coloured frame. In the presence of motion, generally one will find that one part of the area in the previous frame is no longer present at the end of the subsequent frame, and in the subsequent frame the corresponding area will include a part not present in the first frame.

Firstly, parts of the area from a first frame which are still retained in the same area of a second frame are identified from their luminance values and coloured with the colour previously assigned to that area and those luminance values. This, in effect eliminates that part of the area in that first frame which has not been carried over into the subsequent frame. Then, it is determined which portions of the subsequent frame are adjacent the now coloured part and have a luminance value within the assigned luminance levels for that colour thereby indicating that these portions are part of the same area or object. These portions are then coloured with the colour assigned to that area and the corresponding luminance levels. This effectively colours the portions of the area or objects in the subsequent frame, which are not present in the first frame. To summarize, effective movement of an area or object from one frame to a subsequent frame is achieved by a two-step process comprising:

elimination of those parts of the area in the first frame not carried over into the subsequent frame;

and identification of new parts of the area in the subsequent frame not shown in the first frame.

This technique is repeated for each separately coloured area with its associated assigned luminance levels and colour, for the whole of the frame. For all frames, this technique is clearly not going to enable full colouring to be achieved. There are a variety of changes in the image, which are not encompassed by this technique. For example, a new person or object can enter the picture, for which there is no assigned colour and luminance value. Also, in the case of a street scene for example, one vehicle can pass behind another and then re-emerge. The re-emerging vehicle will effectively have to be treated as a new object.

In order to colour the whole of each frame, a number of techniques can be used. For small areas, which are only present for a short time or small number of frames, it is possible that one can ignore them and not colour them without a viewer realizing any detriment in the picture quality. This could occur, for example, in the case of an aircraft which passes across the corner of the background of the picture in the far distance. For each uncoloured area, the computer could make an educated guess from the colours of surrounding areas, the former colour of that area and the background colour. For simplicity, a bland and unobtrusive background colour could always be used.

Another possibility is to interpolate backwards from later frames to earlier frames. The above described technique, enables a computer to follow moving objects from one frame to the next, later frame. Exactly the same principles could be supplied moving backwards through the frames. This could be particularly useful, in the case of an object which enters slowly from one side of the picture. Initially, the object might be so small that the operator would not be aware of it until it has been present for a considerable number of frames and occupies a sizable portion of the picture. It might then be apparent that the object, for example, a dog, is going to traverse across the full width of the picture, and consequently it will need to have a colour assigned to it. The operator can then find it a colour, and instruct the computer to use the technique outlined above to interpolate back through the frames to fully colour this object or area as it enters the picture from one side.

In any case, irrespective of the origin of any uncoloured area, to ensure the best quality picture, the operator himself can decide on the colour of any large uncoloured areas. Also, the operator will keep a check on the decisions made by the computer. The technique of instructing the computer to make educated guesses for uncoloured areas and then having them checked by the operator should enable rapid coloring to be effected. The computer can decide rapidly what colour to assign to an area, and if this is incorrect it should be immediately obvious to the operator who can then correct it. On the other hand, if the computer chooses the correct colour, the operator is not required to choose a colour and he can immediately go on to the next portion of the film or tape. It is quicker for the operator to check the colours and correct any miscolouring by the computer, than for the operator to consider each separate uncoloured area and choose a colour for it.

Modern video technology considers each picture to comprise numerous picture elements, so-called pixels. The use of a picture broken down into pixel is ideally suited to digital computer techniques.

In the present invention the computer can view each area in terms of certain adjacent pixels. When comparing subsequent frames, the computer compares the luminance value of each pixel in a given area with its luminance value in the previously coloured frame, in order to determine the changes in the shape and size of each coloured area. It will be understood that each pixel that has a different luminance level will indicate that the coloured area in question has moved past that pixel in some direction.

Turning now to the drawings, a description will be given of the luminance level or grey scale amplifier shown in FIG. 1, and its mode of operation.

The circuit has an input 1 for a video signal, and an output 2 for that signal. The input 1 is connected to the output 2 via a voltage controlled amplifier 3. Additionally, the input 1 is connected to inputs of a first clipper amplifier 5 and a second clipper amplifier 10. The first clipper amplifier 5 is provided with a variable resistance 6 for adjusting its gain. The first amplifier 5 also has an input connected to a device 7 for setting the clip level. The device 7 sets an input voltage to the other input of the amplifier 5. The second clipper amplifier 10 is similarly provided with a variable resistance 11 for adjusting its gain and a device 12 for adjusting its clip level. The outputs of the two clipper amplifiers 5,10 are connected respectively to a positive input and a negative input of a summation amplifier 15. The output of the amplifier 15 is connected to a control input of the voltage controlled amplifier 3.

Figure 2:
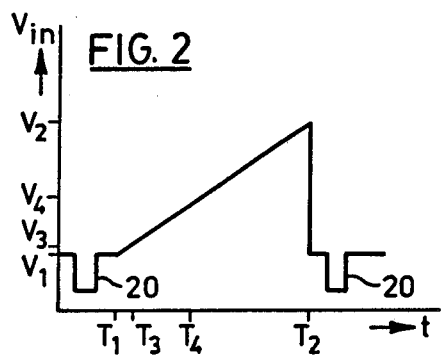
FIG. 2 shows a graph of Voltage against Time for an input video signal.
Figure 3:
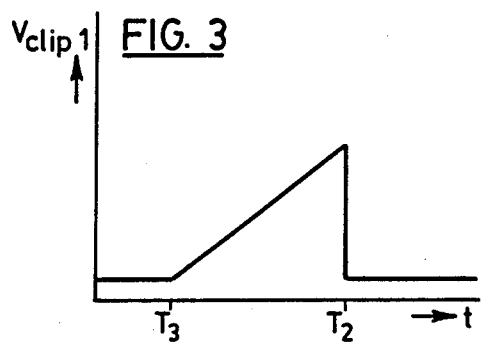
FIG. 3 shows a graph of the output Voltage against Time for a first clipper amplifier.

FIG. 2 shows an input video signal, which has two synchronizing pulses 20, and between these two pulses 20 a ramp wave form. The ramp wave form commences at T1 and finishes at T2. Now, this input video signal is supplied to both the clipper amplifiers 5 and 10. As shown in FIG. 3, in this example, the clip level of the first clipper amplifier 5, set by the device 7, is adjusted so that the output of the first clipper amplifier 5 does not commence until time T3. However, the gain set by the variable resistance 6 is adjusted so that at T2 the output of the first clipper amplifier 5 is equal to the input video signal at that time. Thus, the output of the first clipper amplifier 5 is a ramp wave form, which is shorter and steeper than the input video signal, and whose final amplitude is equal to the final amplitude of the input video signal.

Figure 4:
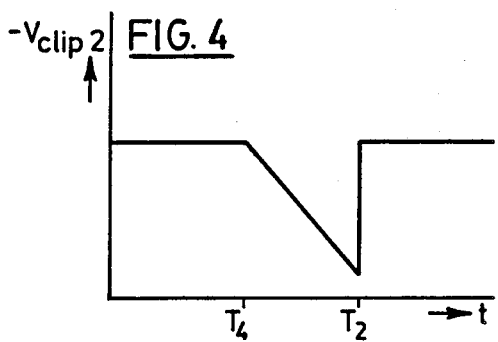
FIG. 4 shows a graph of the output Voltage against Time for a second clipper amplifier.

As the output of the second clipper amplifier 10 is applied to the negative input of the summation amplifier 15, the output of the second clipper amplifier 10 is shown inverted in FIG. 4. Again, the clip level for this second amplifier 10 is so adjusted that the output does not commence until an even later time T4. The gain set by the device 12 is so adjusted that the final amplitude of the output of the second clipper amplifier 10 is equal to the final amplitude of the input video signal. Thus, the output of the second clipper amplifier 10 is an even shorter and steeper ramp wave form, whose final amplitude is equal to the final amplitude of the input video signal.

Figure 5:
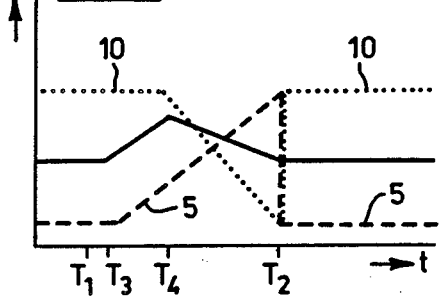
FIG. 5 shows a graph of the D.C. control Voltage against Time.

FIG. 5 shows the effect of combining the outputs of the two clipper amplifiers 5, 10 in the summation amplifier 15. In effect, the output of the second clipper amplifier 10 is subtracted from the output of the first clipper amplifier 5. FIG. 5 shows a graph of the output voltage from the summation amplifier 15. Also, shown in FIG. 5 by dotted lines are the outputs from the two clipper amplifiers 5, 10, these two dotted lines being marked 5 and 10 respectively. From time T1 to time T3, the output of the summation amplifier 15 remains constant, since the ramp outputs of both the clipper amplifiers 5 and 10 have not commenced. At time T3, the output of the summation amplifier 15 starts rising, in proportion to the output of the first clipper amplifier 5. This rise continues until time T4, when the ramp output of the second clipper amplifier 10 commences. Since the output of the second clipper amplifier 10 is steeper than the output from the first clipper amplifier 5, from time T4 the output of the summation amplifier 15 declines steadily. Finally, at time T2, as the final amplitudes of the ramp outputs of the two clipper amplifiers 5 and 10 are equal, the output of the summation amplifier 15 has returned to its initial value.

Figure 6:
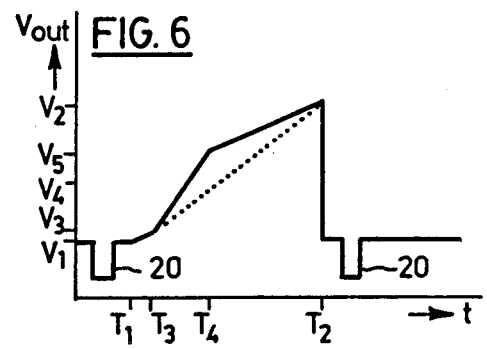
FIG. 6 shows a graph of Voltage against Time for a modified video signal.

The output of the summation amplifier 15 is applied to the control input of the voltage controlled amplifier 3, and the effect of this peaked output on the original video signal is shown in FIG. 6. The original video signal is shown by a dotted line in FIG. 6. The two synchronizing pulses 20 are not effected by the voltage controlled amplifier 3. From time T1 to time T3, the control input is constant, and consequently the output of the voltage controlled amplifier 3 is the same as its input, ie. the video signal remains unaffected. From time T3 to time T4, the rise in the voltage applied to the control input is accelerated steadily, and consequently the video signal is increased in proportion to this rising voltage. From time T4 to time T2, the rise in control voltage is decelerated until it reaches its original value at T2, causing the video signal to increase at a slower rate than the original input video signal, whereby its final amplitude is equal to the final amplitude of the original input video signal.

Additionally, as shown in FIG. 2, the video signal has voltages V1,V2,V3, and V4 at the respective times T1,T2,T3 and T4. The output signal shown in FIG. 6 has effectively had part of the signal compressed and another part correspondingly expanded. The first part of the signal between voltages V1 and V3 remains unchanged. However, a second portion of the original input signal originally had voltages in the range V3-V4, but this has now been expanded to cover the range V3-V5. Similarly, the final portion of the original signal originally covered the band V4-V2, but in the output signal it only covers a narrower band V5-V2. Thus, the portion of the signal between T3-T4 has been expanded to cover a wider voltage range and hence a wider range of luminance levels. Also, the portion of the signals between T4 and T2 has been compressed, so now that it now only covers a narrower voltage band V5-V2 and hence a narrower range of luminous levels. This will enable areas which originally had luminance levels or voltages in the range V3-V4 to be more readily distinguished from one another.

Figure 7:
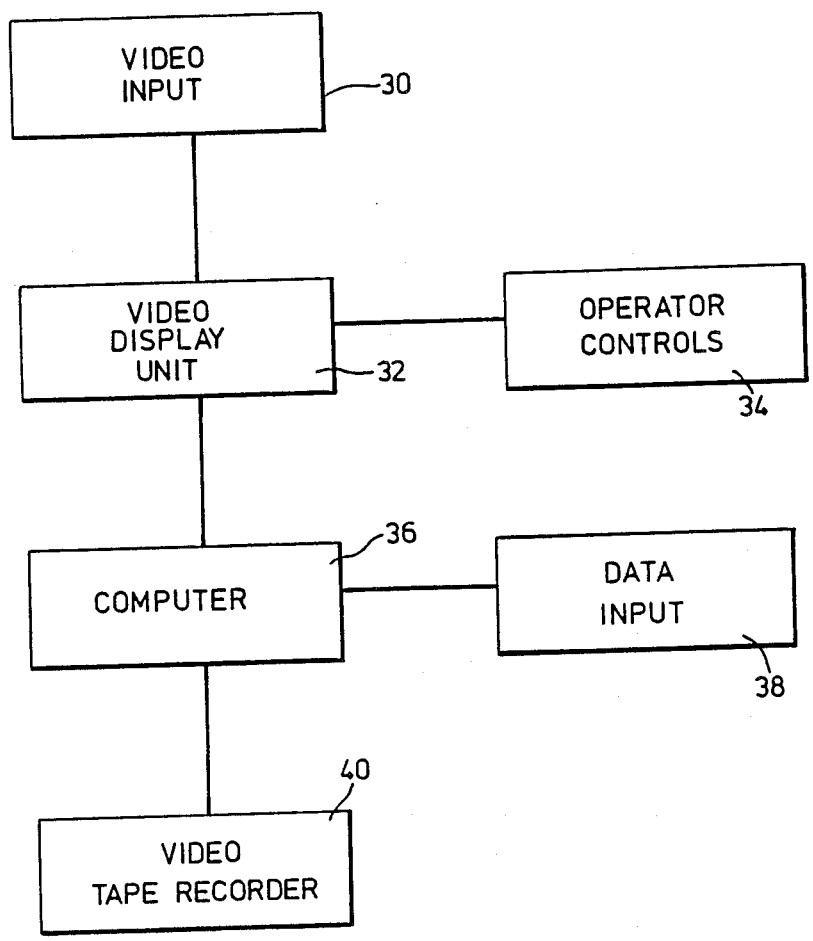
FIG. 7 shows a block diagram of the circuit.

Reference will now be made to FIG. 7, which shows a block diagram of the overall circuit for effecting the method. A video input 30 is provided for inputting the black and white video signal. A preferred method is to store the black and white video signal on tape, and in this case the video input 30 could simply be a video tape player. The video input 30 is connected to a video display unit 32, which can be a conventional colour monitor. This video display unit 32 is connected to various controls for controlling the apparatus, indicated as operator controls 34. The operator controls 34 enable the operator to control the video input 30 and other parts of the apparatus. A computer 36 is connected to the video display unit 32 and preferably is a digital computer. The computer 36 is also connected to a data input 38 and a video tape recorder 40. Via the operator controls 34 and the data input 38, the operator controls the computer 36 to add a colour signal to the original black and white video signal. The black and white video signal and the additional colour signal are stored separately by the computer 36, until a sufficient portion of the original black and white signal has been coloured and the operator is satisfied with the colouring. For example, the operator can colour a 10-minute sequence of the original film or video signal. The original black and white signal and the colour signal are then combined and recorded on a colour video tape by the video tape recorder 40.

Also, there are a number of ways in which the original luminance levels for each area in the first frame are determined. The operator can be provided with a device for tracing around part of an area on a screen. A computer can then analyze the luminance levels within that area, and assign those luminance levels to that area. If necessary, the operator can adjust the upper and lower limits of the luminance levels for that area. Also, for large areas, it may be found that the computer need only consider the luminance levels in a narrow strip around the outside of that area. This has been found to be particularly advantageous when a wide variety of luminance values occur within the area, but the strip around the edge of the area always has luminance levels within a fairly narrow band. The computer need then only look at the luminance levels in the strip around the edge, in order to follow the changing shape of the area from frame to frame, and it does not need to consider variations of luminance level within this outer strip.

We claim:

1. A circuit for receiving an input of a black and white video signal and for expanding and compressing bands of luminance levels to produce a modified signal at a output, the circuit comprising:

a voltage controlled amplifier connected between the input and the output, and adapted to receive the input video signal and a control signal;

first and second clipper amplifiers, each of which is adapted to receive the input video signal, and has means for adjusting the gain and means for adjusting the clip level of the respcective clipper amplifier to affect their respective outputs;

a summation device connected to the outputs of the first and second clipper amplifiers, for producing said control signal and connected to the voltage controlled amplifier to input said control signal thereto.

2. A method of expanding and compressing bands of luminance levels in a black and white video signal, the method comprising:

feeding a black and white video signal to a voltage controlled amplifier and to a first clipper amplifier and a second clipper amplifier, each having means for adjusting the gain and means for adjusting the clip level of that clipper amplifier;

setting the gain and the clip level of the first and second clipper amplifiers to produce desired output characteristics of the first and second clipper amplifiers;

feeding the respective output signals of said first and second clipper amplifiers to a summation amplifier and summing those output signals to produce a control signal;

feeding said control signal to said voltage controlled amplifier to alter its gain, whereby one band of luminance levels of the black and white video signal is expanded so that it occupies a wider range of luminance levels, and another band of luminance levels is compressed so that it occupies a narrower range of luminance levels.

* * * * *